(12) United States Patent
Shimizu et al.

(10) Patent No.: US 6,704,121 B1
(45) Date of Patent: Mar. 9, 2004

(54) IMAGE FORMING METHOD AND IMAGE FORMING APPARATUS

(75) Inventors: Osamu Shimizu, Shizuoka (JP); Yasuko Sonoda, Shizuoka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/549,590

(22) Filed: Apr. 14, 2000

(30) Foreign Application Priority Data

Apr. 16, 1999 (JP) ........................................ P.11-109763

(51) Int. Cl.[7] ........................ H04N 1/405; H04N 1/407; H04N 1/52; B41J 2/36
(52) U.S. Cl. ...................... 358/1.9; 358/3.06; 358/3.26; 358/503; 358/534; 347/188
(58) Field of Search ................................. 358/1.9, 3.01, 358/3.06, 3.09, 3.21, 3.26, 503, 521, 534, 536; 347/183, 188, 191, 15

(56) References Cited

U.S. PATENT DOCUMENTS 5,777,641 A * 7/1998 Suzuki et al. ................. 347/15
6,120,121 A * 9/2000 Tanaka ......................... 347/12

* cited by examiner

Primary Examiner—Scott Rogers
(74) Attorney, Agent, or Firm—Sughrue Mion, PLLC

(57) ABSTRACT

It is one objective of the present invention to provide an image forming apparatus that increases the printing stability for a highlighted portion, and that can form a high quality image without causing a barrier due to the application of excessive energy to a shadow portion. In an image forming apparatus that, when gray level image data are input, divides the data into a plurality of blocks and, for gray level recording, converts the gray level image data into multi-valued data, in accordance with a gray level transformation characteristic determined in accordance with relative pixel positions in each of the blocks, the gray level transformation characteristic is so set that B<0.85A is established, wherein A denotes a maximum value for multi-valued data when the printing density of the gray level image data is equal to or lower than a half tone, and B denotes a minimum value for an envelope that is obtained by coupling extrema of multi-valued data, relative to transform property curves for the printing density, that are equal to or higher than the half tone.

6 Claims, 18 Drawing Sheets

FIG. 6

| 8bit | 10bit |
|---|---|
| 0 | 0 |
| 1 | 4 |
| 2 | 8 |
| 3 | 12 |
| 4 | 16 |
| 5 | 20 |
| 6 | 24 |
| 7 | 28 |
| 8 | 32 |
| 9 | 36 |
| 10 | 40 |
| 11 | 44 |
| 12 | 48 |
| 13 | 52 |
| 14 | 56 |
| 15 | 61 |
| 16 | 65 |
| 17 | 69 |
| 18 | 73 |
| 19 | 77 |
| 20 | 81 |
| 21 | 85 |
| 22 | 89 |
| 23 | 93 |
| 24 | 97 |
| 25 | 101 |
| 26 | 105 |
| 27 | 109 |
| 28 | 113 |
| 29 | 117 |
| 30 | 121 |
| 31 | 125 |
| 32 | 129 |
| 33 | 133 |
| 34 | 137 |
| 35 | 141 |
| 36 | 145 |
| 37 | 149 |
| 38 | 153 |
| 39 | 157 |
| 40 | 161 |
| 41 | 165 |
| 42 | 169 |
| 43 | 174 |
| 44 | 178 |
| 45 | 182 |
| 46 | 186 |
| 47 | 190 |
| 48 | 194 |
| 49 | 198 |
| 50 | 202 |
| 51 | 206 |
| 52 | 210 |
| 53 | 214 |
| 54 | 218 |
| 55 | 222 |
| 56 | 226 |
| 57 | 230 |
| 58 | 234 |
| 59 | 238 |
| 60 | 242 |
| 61 | 246 |
| 62 | 250 |
| 63 | 254 |
| 64 | 258 |
| 65 | 262 |
| 66 | 266 |
| 67 | 270 |
| 68 | 274 |
| 69 | 278 |
| 70 | 282 |
| 71 | 287 |
| 72 | 291 |
| 73 | 295 |
| 74 | 299 |
| 75 | 303 |
| 76 | 307 |
| 77 | 311 |
| 78 | 315 |
| 79 | 319 |
| 80 | 323 |
| 81 | 327 |
| 82 | 331 |
| 83 | 335 |
| 84 | 339 |
| 85 | 343 |
| 86 | 347 |
| 87 | 351 |
| 88 | 355 |
| 89 | 359 |
| 90 | 363 |
| 91 | 367 |
| 92 | 371 |
| 93 | 375 |
| 94 | 379 |
| 95 | 383 |
| 96 | 387 |
| 97 | 391 |
| 98 | 395 |
| 99 | 400 |
| 100 | 404 |
| 101 | 408 |
| 102 | 412 |
| 103 | 416 |
| 104 | 420 |
| 105 | 424 |
| 106 | 428 |
| 107 | 432 |
| 108 | 436 |
| 109 | 440 |
| 110 | 444 |
| 111 | 448 |
| 112 | 452 |
| 113 | 456 |
| 114 | 460 |
| 115 | 464 |
| 116 | 468 |
| 117 | 472 |
| 118 | 476 |
| 119 | 480 |
| 120 | 484 |
| 121 | 488 |
| 122 | 492 |
| 123 | 496 |
| 124 | 500 |
| 125 | 504 |
| 126 | 508 |
| 127 | 513 |
| 128 | 517 |
| 129 | 521 |
| 130 | 525 |
| 131 | 529 |
| 132 | 533 |
| 133 | 537 |
| 134 | 541 |
| 135 | 545 |
| 136 | 549 |
| 137 | 553 |
| 138 | 557 |
| 139 | 561 |
| 140 | 565 |
| 141 | 569 |
| 142 | 573 |
| 143 | 577 |
| 144 | 581 |
| 145 | 585 |
| 146 | 589 |
| 147 | 593 |
| 148 | 597 |
| 149 | 601 |
| 150 | 605 |
| 151 | 609 |
| 152 | 613 |
| 153 | 617 |
| 154 | 621 |
| 155 | 626 |
| 156 | 630 |
| 157 | 634 |
| 158 | 638 |
| 159 | 642 |
| 160 | 646 |
| 161 | 650 |
| 162 | 654 |
| 163 | 658 |
| 164 | 662 |
| 165 | 666 |
| 166 | 670 |
| 167 | 674 |
| 168 | 678 |
| 169 | 682 |
| 170 | 686 |
| 171 | 690 |
| 172 | 694 |
| 173 | 698 |
| 174 | 702 |
| 175 | 706 |
| 176 | 710 |
| 177 | 714 |
| 178 | 718 |
| 179 | 722 |
| 180 | 726 |
| 181 | 730 |
| 182 | 734 |
| 183 | 739 |
| 184 | 743 |
| 185 | 747 |
| 186 | 751 |
| 187 | 755 |
| 188 | 759 |
| 189 | 763 |
| 190 | 767 |
| 191 | 771 |
| 192 | 775 |
| 193 | 779 |
| 194 | 783 |
| 195 | 787 |
| 196 | 791 |
| 197 | 795 |
| 198 | 799 |
| 199 | 803 |
| 200 | 807 |
| 201 | 811 |
| 202 | 815 |
| 203 | 819 |
| 204 | 823 |
| 205 | 827 |
| 206 | 831 |
| 207 | 835 |
| 208 | 839 |
| 209 | 843 |
| 210 | 847 |
| 211 | 852 |
| 212 | 856 |
| 213 | 860 |
| 214 | 864 |
| 215 | 868 |
| 216 | 872 |
| 217 | 876 |
| 218 | 880 |
| 219 | 884 |
| 220 | 888 |
| 221 | 892 |
| 222 | 896 |
| 223 | 900 |
| 224 | 904 |
| 225 | 908 |
| 226 | 912 |
| 227 | 916 |
| 228 | 920 |
| 229 | 924 |
| 230 | 928 |
| 231 | 932 |
| 232 | 936 |
| 233 | 940 |
| 234 | 944 |
| 235 | 948 |
| 236 | 952 |
| 237 | 956 |
| 238 | 960 |
| 239 | 965 |
| 240 | 969 |
| 241 | 973 |
| 242 | 977 |
| 243 | 981 |
| 244 | 985 |
| 245 | 989 |
| 246 | 993 |
| 247 | 997 |
| 248 | 1001 |
| 249 | 1005 |
| 250 | 1009 |
| 251 | 1013 |
| 252 | 1017 |
| 253 | 1021 |
| 254 | 1022 |
| 255 | 1023 |

FIG. 13
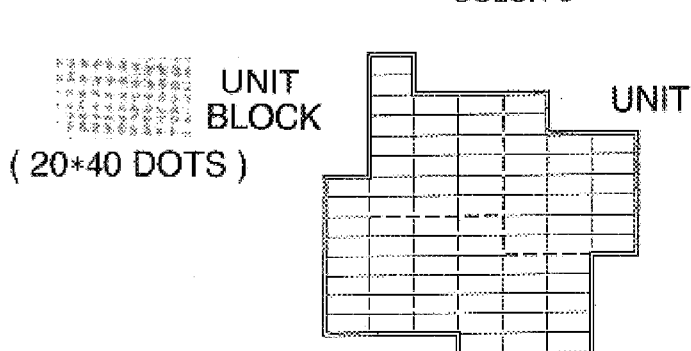
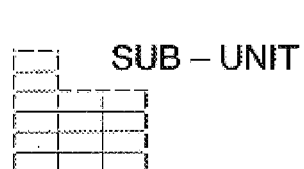

SCREEN ANGLE OF APPROXIMATELY 45°

SCREEN ANGLE OF
APPROXIMATELY 75° — 60

SCREEN ANGLE OF
APPROXIMATELY 15°   60

SCREEN ANGLE OF
APPROXIMATELY 30°

IMAGE FORMING METHOD AND IMAGE FORMING APPARATUS

BACKGROUND OF THE INVENTION

1. Field of the Invention

The present invention relates to an image forming method and an image forming apparatus having a high quality gray level image, and in particular, to a technique whereby a transformation characteristic, for transforming the gray level data of an input image into an energy value for printing, is set to a property appropriate for a highlighted portion and a shadow portion.

2. Description of the Related Arts

To record multi-color images, according to one well known method, a gray level transformation characteristic is employed whereby image data for individual colors that are input to an image forming apparatus are divided into blocks that are composed of predetermined areas, and whereby, in accordance with the individual pixel positions in each block, a gray level is transformed into an energy value for image printing, so that the gray level of each pixel is transformed for gray level recording.

According to this image forming method, in the process for transforming the gray level of the image data into energy for a recording head, the transformation characteristic is so set that the maximum energy value applied to the highlighted portion of a printed image is substantially equal to that of the shadow portion.

For this transformation characteristic, however, the quality of the highlighted portion of a printed image may be poor. In order to improve the quality, the energy applied for the transformation characteristic must be increased. When the energy applied is increased, the highlighted portion can be stably printed, but in this case, excessive energy is applied to the shadow portion and causes a harmful influences such as a deterioration of an image quality in that portion.

For example, as the harmful influences, the following points is given. In thin film thermal transfer typed image forming apparatus, image density is lowered. In ink-jet typed image forming apparatus, image confusion or late drying is sometimes accompanied with increase of excess of ink. Further in silver salt typed image forming apparatus, image density is reversed.

SUMMARY OF THE INVENTION

To resolve this problem, it is one objective of the present invention to provide an image forming method and an image forming apparatus that increases the printing stability for a highlighted portion, and that can form a high quality image without causing a barrier due to the application of excessive energy to a shadow portion.

To achieve the above objective, according to a first aspect of the present invention, provided is an image forming method that, when gray level image data are input, divides the data into a plurality of blocks and, for gray level recording, converts the gray level image data into multi-valued data, in accordance with a gray level transformation characteristic, determined in accordance with relative pixel positions in each of the blocks, whereby, in accordance with the gray level transformation characteristic, B<A is established, wherein A denotes a maximum value for multi-valued data when the printing density of the gray level image data is equal to or lower than a half tone, and B denotes a minimum value for an envelope that is obtained by coupling extrema of multi-valued data, relative to transformation characteristic curves for the printing density, that are equal to or higher than the half tone.

For this image forming method, the transformation characteristic is so set that B<A is established, wherein A denotes a maximum value for multi-valued data when the printing density of the image gray level data is equal to or lower than a half tone, and B denotes a minimum value for an envelope that is obtained by coupling extrema of multi-valued data, relative to transformation characteristic curves for the printing density, that are equal to or higher than the half tone. Therefore, the relative energy applied to the highlighted portion can be increased to improve the stability of the density, and the relative energy applied to the shadow portion can be reduced to remove a barrier due to the excessive application of energy. As a result, a high quality printed image can be obtained.

According to a second aspect of the present invention, wherein said gray level transformation characteristic is so set that B<0.85A is established.

For this image forming method, the relative energy applied to the highlighted portion can be increased to improve the stability of the density, or the relative energy applied to the shadow portion can be reduced to remove a barrier due to the excessive application of energy. At least one of the above advantages can be performed certainly. As a result, a high quality printed image can be obtained.

According to a third aspect of the present invention, provided is an image forming apparatus that, when gray level image data are input, divides the data into a plurality of blocks and, for gray level recording, converts the gray level image data into multi-valued data, in accordance with a gray level transformation characteristic, determined in accordance with relative pixel positions in each of the blocks, whereby, in accordance with the gray level transformation characteristic, B<A is established, wherein A denotes a maximum value for multi-valued data when the printing density of the gray level image data is equal to or lower than a half tone, and B denotes a minimum value for an envelope that is obtained by coupling extrema of multi-valued data, relative to transformation characteristic curves for the printing density, that are equal to or higher than the half tone.

For this image forming apparatus, the transformation characteristic is so set that B<A is established, wherein A denotes a maximum value for multi-valued data when the printing density of the image gray level data is equal to or lower than a half tone, and B denotes a minimum value for an envelope that is obtained by coupling extrema of multi-valued data, relative to transformation characteristic curves for the printing density, that are equal to or higher than the half tone. Therefore, the relative energy applied to the highlighted portion can be increased to improve the stability of the density, and the relative energy applied to the shadow portion can be reduced to remove a barrier due to the excessive application of energy. As a result, a high quality printed image can be obtained.

According to a fourth aspect of the present invention, wherein said gray level transformation characteristic is so set that B<0.85A is established.

For this image forming method, at least one of following advantages can be performed certainly. The relative energy applied to the highlighted portion can be increased to improve the stability of the density, and the relative energy applied to the shadow portion can be reduced to remove a barrier due to the excessive application of energy. As a result, a high quality printed image can be obtained.

According to a fifth aspect of the present invention, a thermal head is employed as a recording head for the image forming apparatus.

Since a thermal head is employed as the recording head of the image forming apparatus, data obtained by a gray level transformation can be output as energy that is to be applied to the thermal head, and the data can be used for high quality printing.

According to a sixth aspect of the present invention, the image forming apparatus employs a heatsensitive transfer material that includes a substantially transparent heatsensitive ink layer, which contains a pigment of 30 to 70 weight % and an amorphous organic polymer of 25 to 60 weight %, which has a softening point of 40° C. to 150° C. and has a thickness of 0.2 to 1.0 μm, so that the particle diameter of at least 70% of the pigment in the heatsensitive ink layer is equal to or smaller than 1.0 μm, and so that on a white supporting member the optical reflective density of a transferred image is at least 1.0 μm.

Since the heatsensitive transfer material is specified for the image forming apparatus, the obtained color reproductivity and quality are fairly close to those of printed matter, and the quality of the gray level recording that is performed is superior.

BRIEF DESCRIPTION OF THE DRAWINGS

FIG. 6 is a diagram showing an example transformation table for transforming a gray level from 8 bits to 10 bits;

FIG. 13 is a diagram showing a unit block and units for color C (a screen angle of approximately 75 degrees);

DETAILED DESCRIPTION OF THE PREFERRED EMBODIMENT

Figure 1:
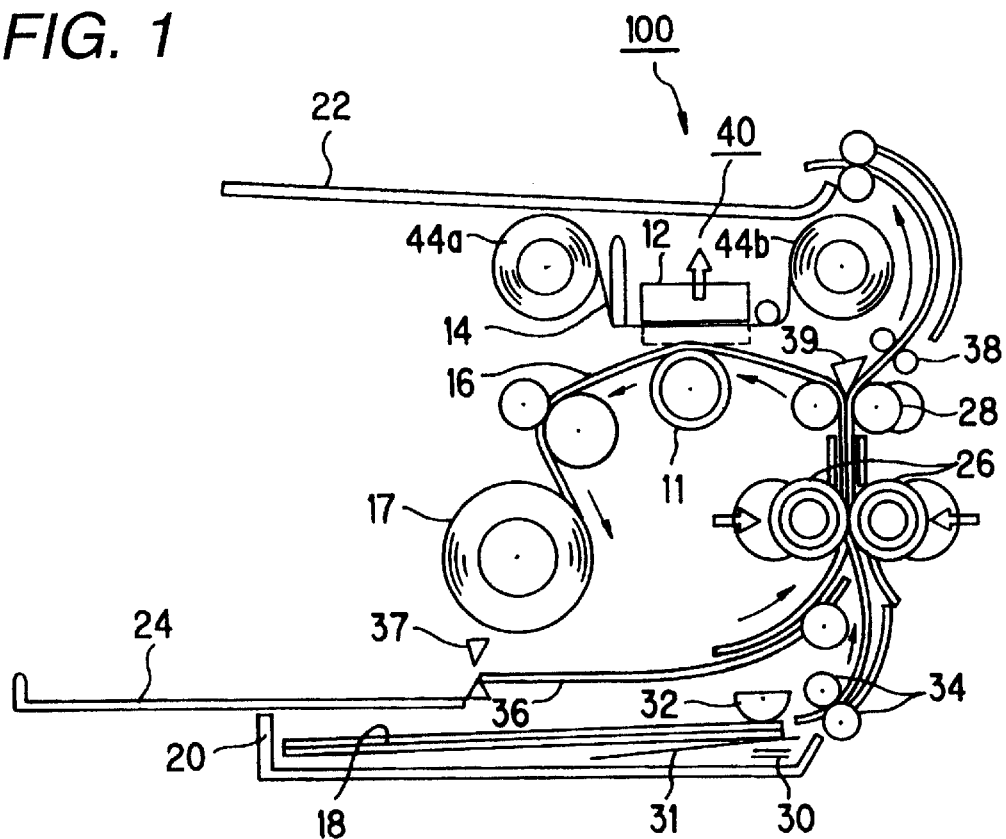
FIG. 1 is a conceptual diagram showing the essential arrangement of an image forming apparatus according to the present invention.
Figure 2:
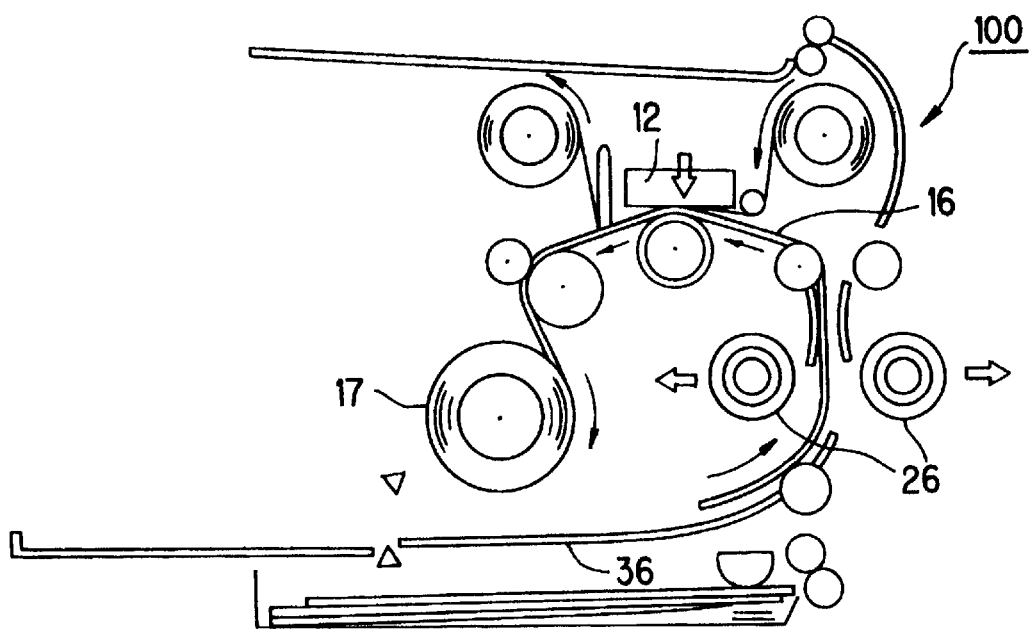
FIG. 2 is a diagram for explaining the printing operation performed by the image forming apparatus in FIG. 1.
Figure 3:
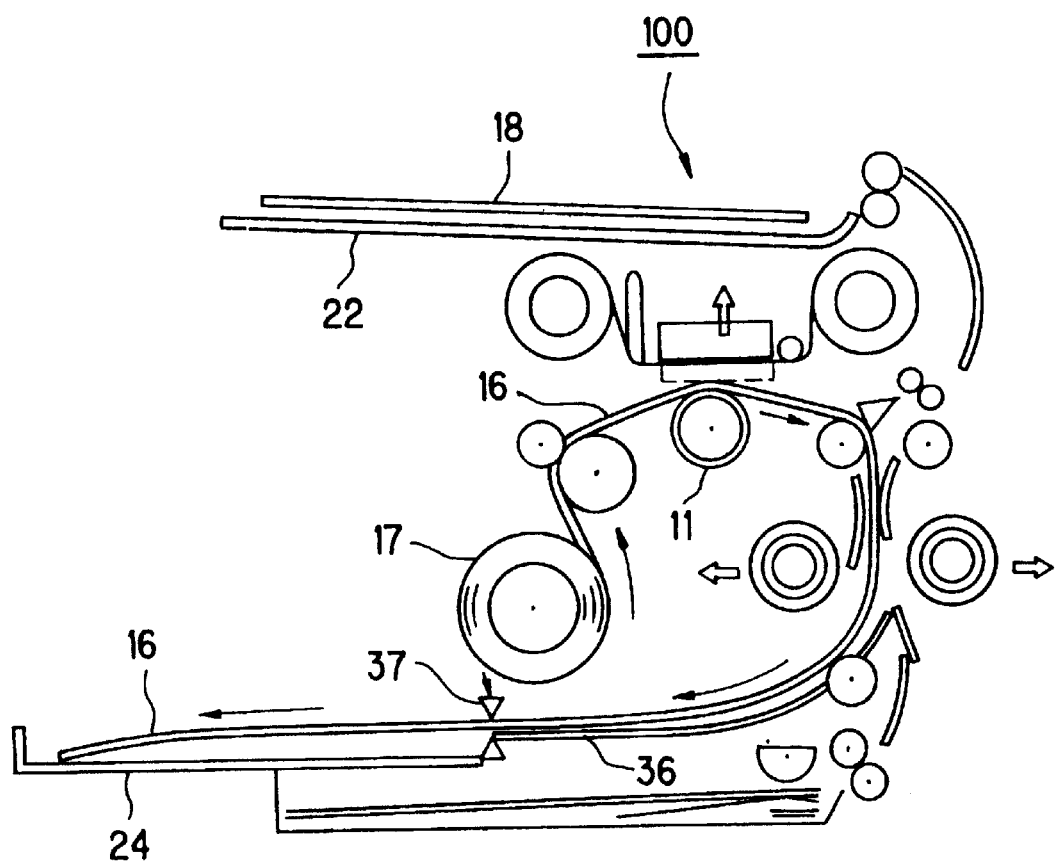
FIG. 3 is a diagram for explaining the receiver sheet discharging operation performed by the image forming apparatus in FIG. 1.

The preferred embodiment of the present invention will now be described in detail while referring to the drawings. First, the arrangement of an image forming apparatus according to a first embodiment of the present invention is shown in FIGS. 1 to 3. FIG. 1 is a conceptual diagram showing the essential arrangement of the image forming apparatus of this invention, FIG. 2 is a diagram for explaining the printing operation performed by the image forming apparatus in FIG. 1, and FIG. 3 is a diagram for explaining the receiver sheet discharging operation performed by the image forming apparatus in FIG. 1.

An image forming apparatus 100 (hereinafter referred to as a printer) is designed as a laminator incorporating printer wherein a pair of thermal pressing and heating rollers are provided along a sheet delivery path. The laminator incorporating printer 100 comprises: a platen 11; a thermal head 12, whereby a heating element is positioned opposite the platen 11; an ink ribbon 14, which is positioned between the platen 11 and the thermal head 12 and which is advanced during the printing process; a receiver sheet supply roll 17, which comprises a roll of receiver sheet 16; a paper cassette 20, in which paper sheets 18 are stacked; a discharge tray 22, to which is discharged an image bearing sheet 18; a waste tray 24, to which is discharged a length of the receiver sheet 16 from which an image has been transferred to the sheet 18; a pair of thermal pressing rollers 26; and a pair of peeling rollers 28.

A metal plate 31, which is provided for the paper cassette 20, is urged upward by a spring 30, pushing the sheets 18 upward and pressing them against a pickup roller 32. As the pickup roller 32 is rotated, the top sheet 18, which is pressed against the pickup roller 32, is extracted from the paper cassette 20 and is fed upward to the thermal pressing roller pair 26.

The thermal pressing rollers 26 can be rotated forward and backward, and can be horizontally displaced so that they are proximate or separated. When the thermal pressing rollers 26 are moved until they are proximate, they convey sheets (a receiver sheet 16 and a sheet 18) while applying thermal pressure to them. When the thermal pressing rollers 26 are moved so that they are separated, the thermal pressure applied to the sheets is released.

A receiver sheet cutter 37 is provided along a waste path 36 between the thermal heating rollers 26 and the waste tray 24. The receiver sheet cutter 37 cuts the receiver sheet 16 to remove a used portion transported along the waste path 36.

The operation of the thus arranged printer 100 will now be described.

During the printing process, as is shown in FIG. 2, a portion of the receiver sheet 16, the size of one sheet 18, is fed from the supply roll 17, and an image is printed by the thermal head 12 on the receiver sheet 16 in the direction indicated by an arrow. At this time, the thermal heating rollers 26 are separated and do not contact the receiver sheet 16. For color printing, the number of times this processing sequence is repeated is equivalent to the color count.

When the printing of the image on the receiver sheet 16 has been completed, to prepare to transfer the image to a sheet 18, the sheet 18 sized portion of the receiver sheet 16 is again fed out until the leading edge of the image is positioned near the insertion position for the thermal heating rollers 26.

Then, a sheet 18 is fed from the paper cassette 20 by the pickup roller 32. When the leading edge of the sheet 18 passes between the thermal heating rollers 26, they are brought together, and apply thermal pressure to the receiver sheet 16 and the sheet 18 while conveying them upward, as is shown in FIG. 1. It should be noted that the thermal pressing rollers 26 approach each other after the leading edge of the sheet 18 has passed the point at which thermal pressure is applied, so that the leading edge of the sheet 18 is prevented from adhering to the receiver sheet 16.

At the peeling rollers 28, the sheet 18 is separated from the receiving sheet 16 by a peeling pawl 39, the distal end of which is inserted between the receiving sheet 16 and the leading edge of the sheet 18, which does not adhere to the receiver sheet 16. Then, the sheet 18 is discharged to the discharge tray 22 by conveying rollers 38. Since the distal end of the peeling pawl 39 is inserted between the receiver sheet 16 and the sheet 18, the sheet 18 can be safely separated from the receiving sheet 16.

As the portion near the trailing end of the sheet 18 is passing through the thermal heating rollers 26, the heating rollers 26 are again separated and returned to their original positions.

As is shown in FIG. 3, the portion of the receiver sheet 16 from which the image was transferred to the sheet 18 is carried down to the waste tray 24, past the receiver sheet cutter 37, and is cut off and deposited in the waste tray 24. The process whereby the waste portion of the receiver sheet 16 is disposed of also serves as the feeding process for printing the next image.

In order to eliminate the process whereby an image is transferred to a sheet 18, the printed portion of a receiver sheet 16 can be carried down to the waste tray 24, past the receiver sheet cutter 37, and cut off and deposited in the waste tray 24. In this fashion, the portion of the receiver sheet 16 bearing an image can be discharged to the waste tray 24.

Figure 4:
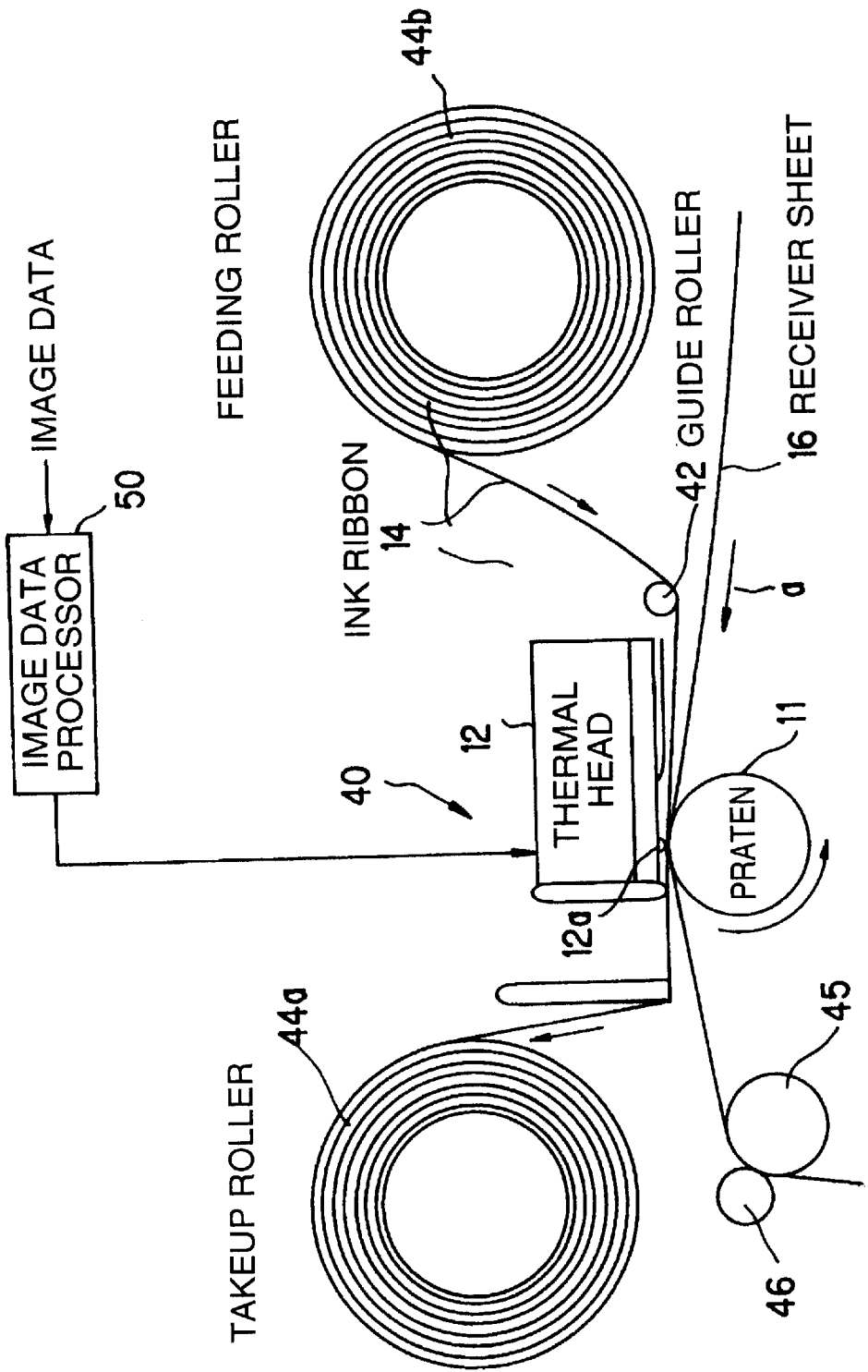
FIG. 4 is a detailed diagram illustrating a printing unit in a printer.

A printing unit 40 in the printer 100 will now be described in detail while referring to FIG. 4.

The cylindrical platen 11, located opposite the thermal head 12, is rotated counterclockwise, for example, to convey the receiver sheet 16, and is pressed against and exerts a predetermined pressure on the thermal head 12 and the ink ribbon 14 that passes between them. The ink ribbon 14 is wound around a takeup roll 44a via a guide roller 42.

An image is thermally transferred via the ink ribbon 14 to the receiver sheet 16 by the heat-generating resistor of the thermal head 12, and the resultant receiver sheet 16 is transported past the platen 11 by a pair of rollers 45 and 46.

The thermal head 12 is used for recording an image having a density of approximately 600 dpi (dots per inch), or 300, 800, 1200 or 2400 dpi, depending on the case. The heat-generating resistors are arranged in one direction (a direction perpendicular to the sheet face in FIG. 4) for recording an image for one line on the receiver sheet 16.

The platen 11 rotates at a predetermined image transfer speed, while holding the receiver sheet 16 in a predetermined position, and conveys the receiver sheet 16 in the direction (the direction indicated by an arrow a in FIG. 4) that is substantially perpendicular to the direction in which a graze 12a of the thermal head 12 is extended.

In the operation for recording an image using the printing unit 40, the receiver sheet 16 is moved to a specific transfer start position opposite the graze 12a, and is aligned with the ink ribbon 14 (for a color image, this process is performed for each color, K, C, M and Y). The receiver sheet 16 is then fed by the platen 1 in the direction indicated by an arrow a.

As the image receiver sheet 16 is transported, the individual heat-generating resistors of the graze 12a are heated in accordance with image data, and an image transfer process is performed for the receiver sheet 16. As a result, the image is transferred and recorded on the receiver sheet 16. For a color image, images for individual colors are transferred in the order K, C, M, Y, for example, and are superimposed on the receiver sheet 16.

In this process, image data obtained by an image data output apparatus, such as a computer, are transmitted to the thermal head 12 via an image data processor 50.

Figure 5:
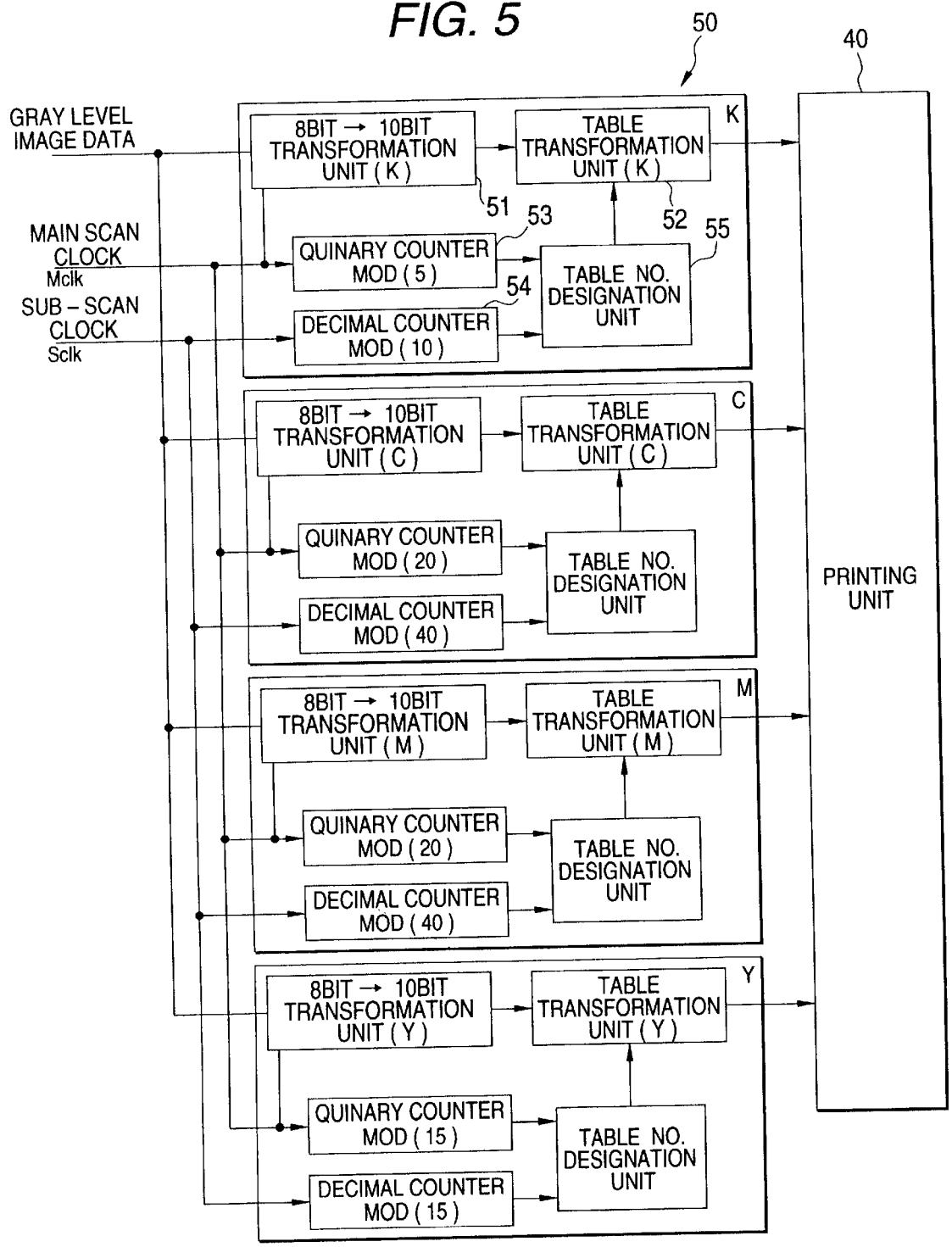
FIG. 5 is a signal processing block diagram showing the image data processing performed by an image data processor.

The image data processing performed by the image data processor 50 will now be described while referring to a signal processing block diagram in FIG. 5. In FIG. 5, the data processing that is shown extends from the time the gray level transformation, for image data transmitted to the image data processor 50, is performed until the resultant image data are output to the printing unit 40.

The gray level image data transmitted to the image data processor 50 in FIG. 5 are image data that in this embodiment have an 8-bit gray level (256 gray levels) and a resolution of 600 dpi. The image data are transformed into data for 1200 dpi only in the sub-scan direction. This transformation can be performed by the nearest neighbors interpolation method, or the linear interpolation method that was proposed by one of the present inventors and is described in Japanese Unexamined Patent publication No. Hei 10-191058.

The image gray level data of 600 dpi in the main scan direction and 1200 dpi in the sub-scan direction are transformed by processors that are provided for the individual colors (K, C, M and Y), and the resultant data are output to the printing unit 40.

For this description of the image data processing, an explanation will be given using the color K as an example. First, 8-bit gray level image data (256 gray levels) are transmitted to an 8 bit-10 bit transformation unit 51, whereat the gray level of the gray level image data is changed from 8 bits to 10 bits (1024 gray levels). The transformation table is shown in FIG. 6. While this transformation process is performed substantially in accordance with the transformation table in FIG. 6, the transformation value is changed as needed for each printed image position in the main scan direction, in accordance with the characteristics of each recording head element, a head pressure distribution and the characteristics of a recording material.

Then, 10-bit the gray level image data are transmitted to a table transformation unit 52. The table transformation unit 52 is provided in advance with a table (a characteristic curve) representing energy, which is to be applied to the recording head to generate recording dots, and the gray level. The gray level of the input gray level image data is transformed into an applied energy based on the characteristic curve. The applied energy corresponds to a pulse width applied to the recording head in this embodiment.

Figure 7:
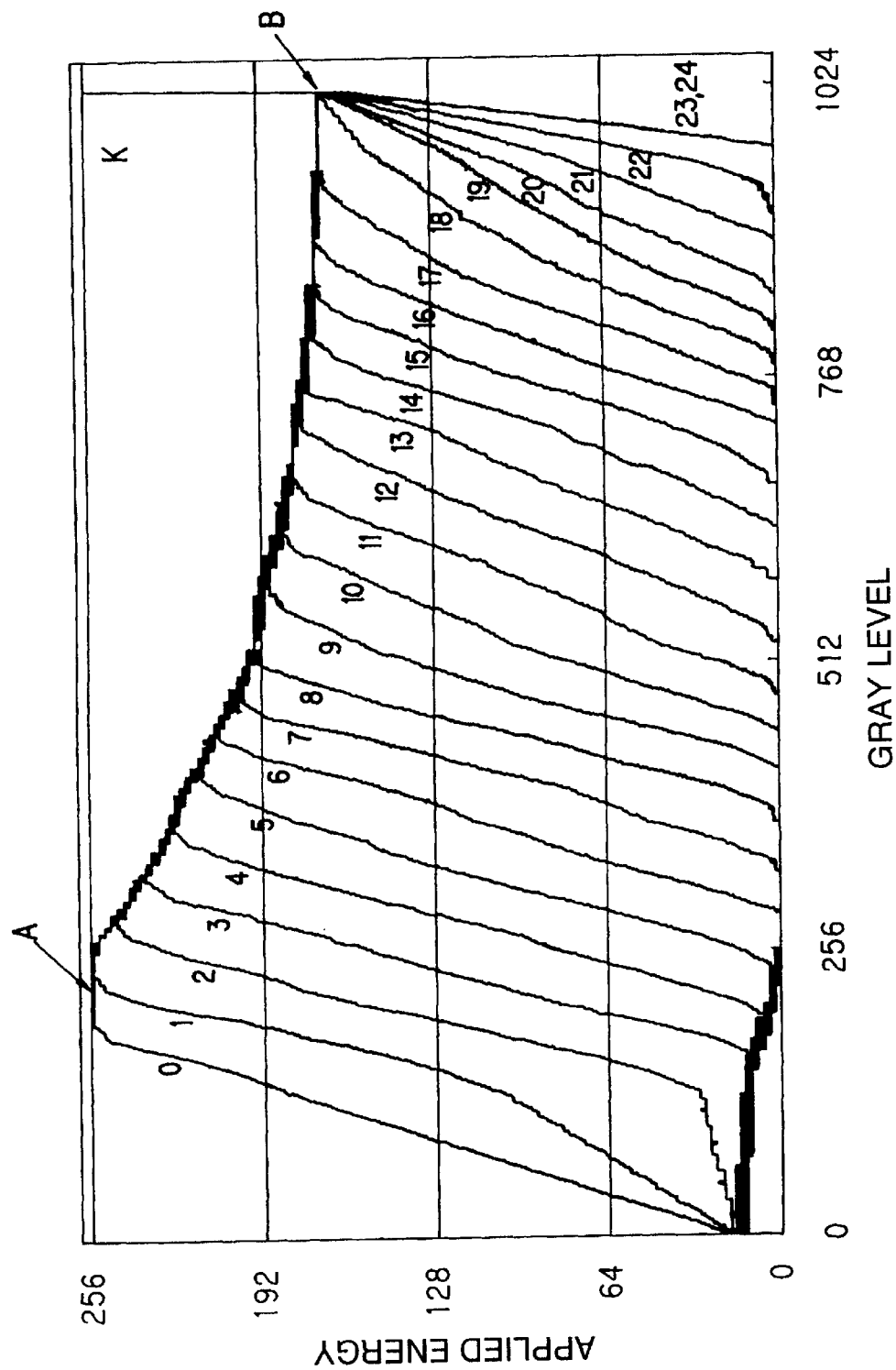
FIG. 7 is a graph showing characteristic curves in a K color gray level transformation table that represents the relationship between a gray level and the energy applied to a recording head.

FIG. 7 is a graph showing the gray level transformation characteristic for color K, on which the transformation table is based. The horizontal axis in FIG. 7 represents the gray level of the image data that have been transformed into 10-bit data, and the vertical axis represents the energy that is to be applied to the printer and that corresponds to the size of the recording dot. A total of 25 (0 to 24) characteristic curves are set as the gray level transformation characteristic in FIG. 7. These curves specify the degree of the growth of the recording dot.

Figure 8:
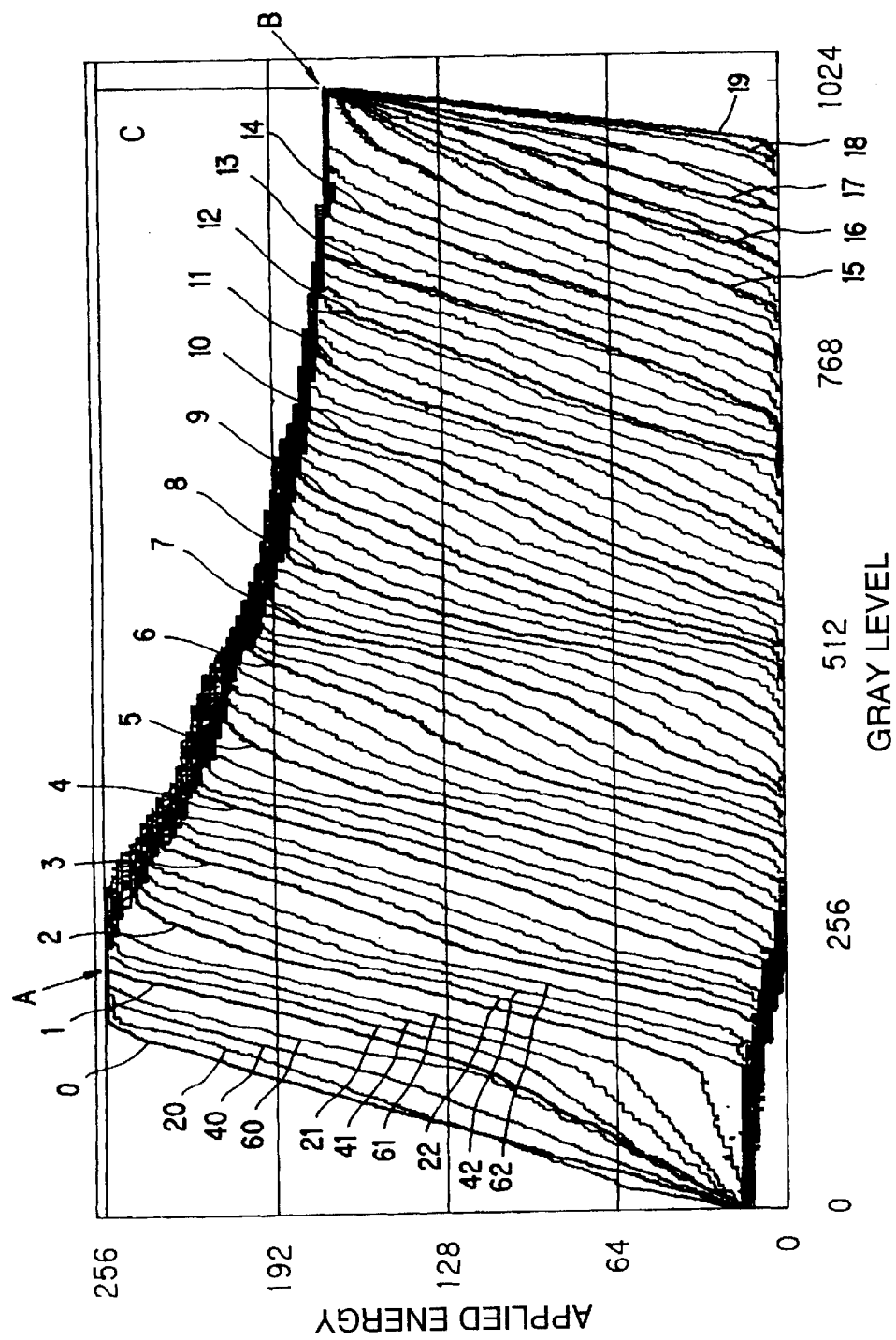
FIG. 8 is a graph showing characteristic curves in a C color gray level transformation table that represents the relationship between a gray level and the energy applied to a recording head.
Figure 9:
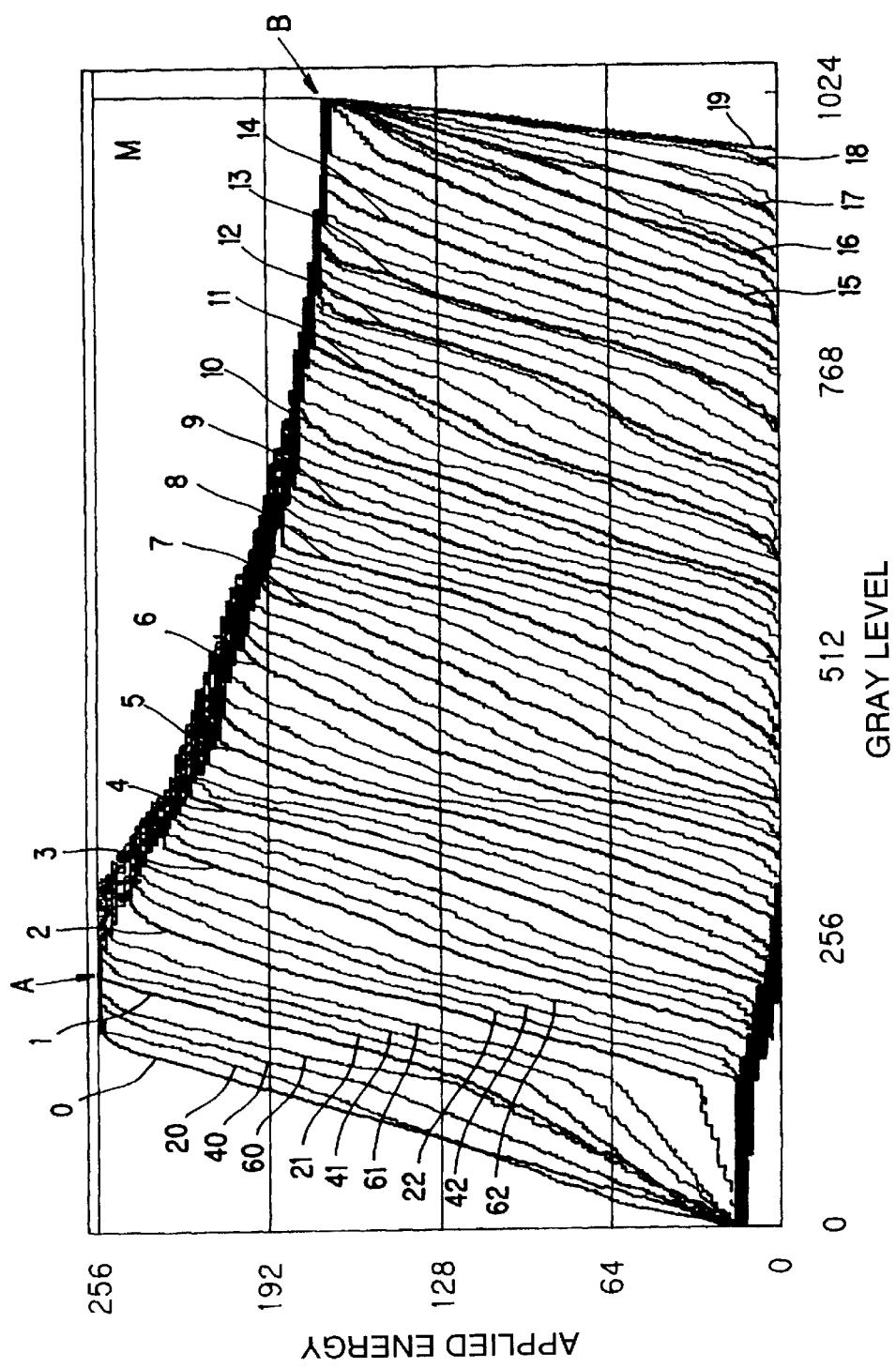
FIG. 9 is a graph showing characteristic curves in an M color gray level transformation table that represents the relationship between a gray level and the energy applied to a recording head.
Figure 10:
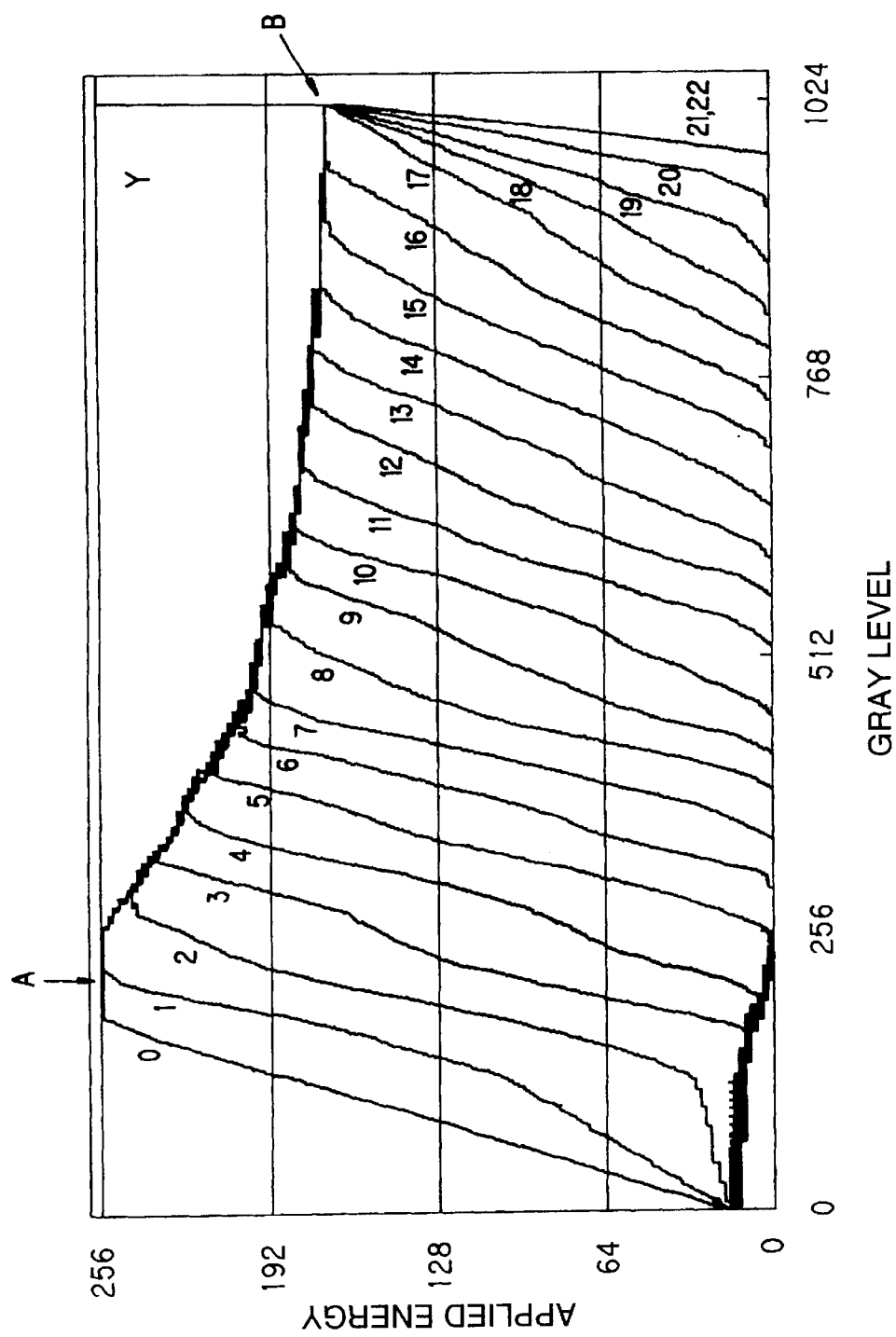
FIG. 10 is a graph showing characteristic curves in a Y color gray level transformation table that represents the relationship between a gray level and the energy applied to a recording head.

Similarly, the gray level characteristics for colors C, M and Y are as shown in FIGS. 8 to 10.

As is shown in FIG. 5, an image is divided into blocks having a predetermined size by performing a frequency division of main scan clock Mclk and sub-scan clock Sclk, which are pixel position information for gray level image data, and the relative pixel position for each block is set.

Figure 11:
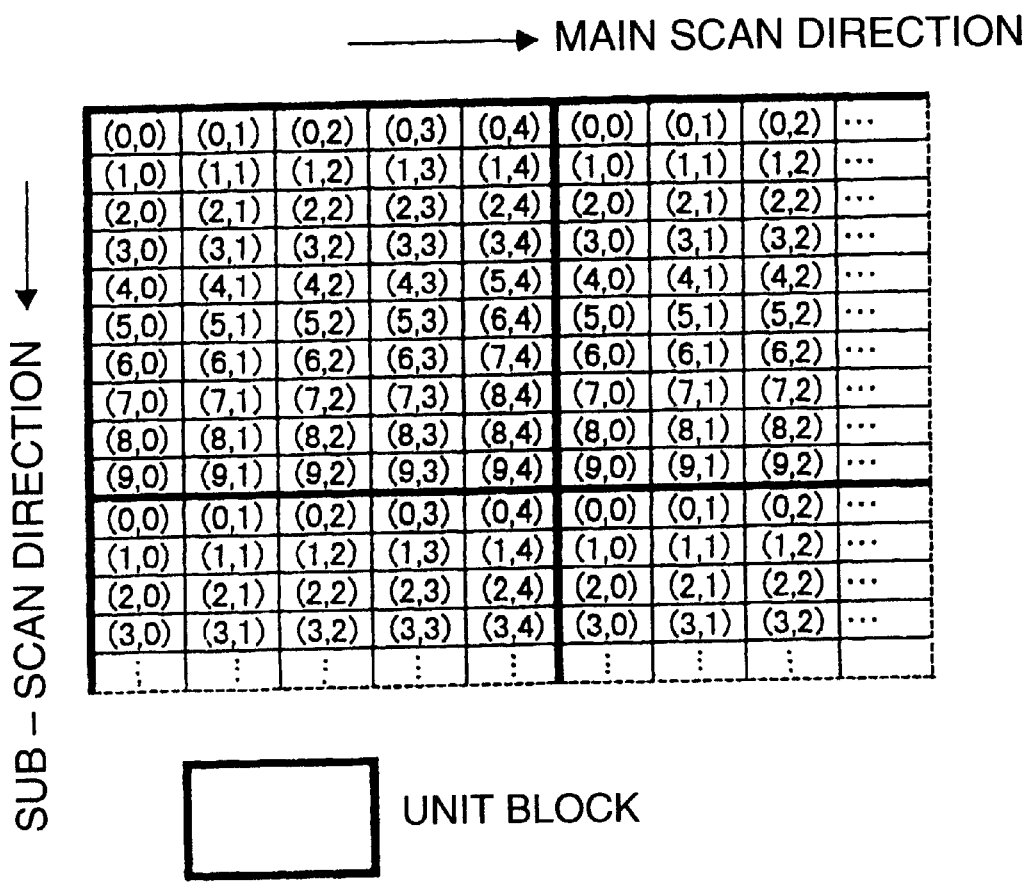
FIG. 11 is a diagram showing the relative pixel positions in each block that are established by a quinary counter and a decimal counter.

Specifically, for color K, the main scan clock Mclk and the sub-scan clock Sclk are entered in a quinary counter 53 and a decimal counter 54. The quinary counter 53 outputs a remainder obtained by dividing an input value by five, and the decimal counter 54 outputs a remainder obtained by dividing an input value by ten. Therefore, unit blocks, each of which is composed of 5 dots in the main scan direction and 10 dots in the sub-scan direction, as is shown in FIG. 11, are periodically positioned over an image represented by the gray level image data, and position information (i, j) is provided for each pixel in the unit block.

Figure 12:
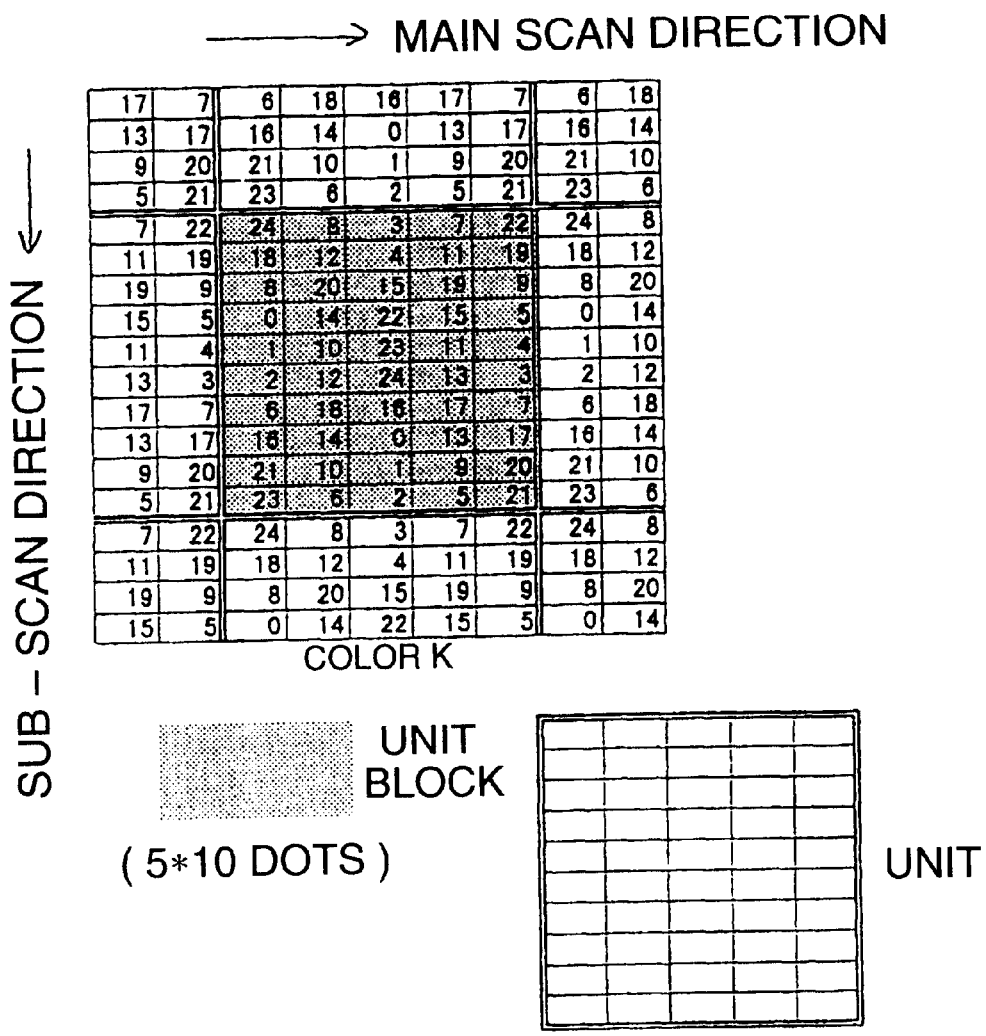
FIG. 12 is a diagram showing a unit block and units for color K (a screen angle of approximately 45 degrees)

The position information (i,j) for each unit block is transmitted to a table number designation unit 55 in FIG. 5, to designate a characteristic curve that is to be used for each pixel in the unit block. FIG. 12 is a diagram showing a K color transformation matrix that is stored in the table number designation unit 55. For each pixel position in the unit block the number of a corresponding characteristic curve is shown. The numbers (0 to 24) in the transformation matrix in FIG. 12 correspond to the lines (0 to 24) of the characteristic curves in FIG. 9.

Specifically, the numbers (0 to 24) correspond to gray level image data in the unit block that is defined by the quinary counter 53 and the decimal counter 54, and are provided for the pixel position in the unit block. The growth of the recording dot is based on the characteristic curve that corresponds to the number. For example, for gray level image data (color K) when the pixel position in the block is (3,0), a corresponding pixel position is determined to be number 0 by referring to the transformation matrix in FIG. 12. Therefore, the gray level of the image data is transformed into energy by using the characteristic curve number 0 in FIG. 7. The transformation process is repeated for the entire area occupied by the input gray level image data, and the obtained energy value (multi value data) is output to the printing unit 40.

Figure 14:
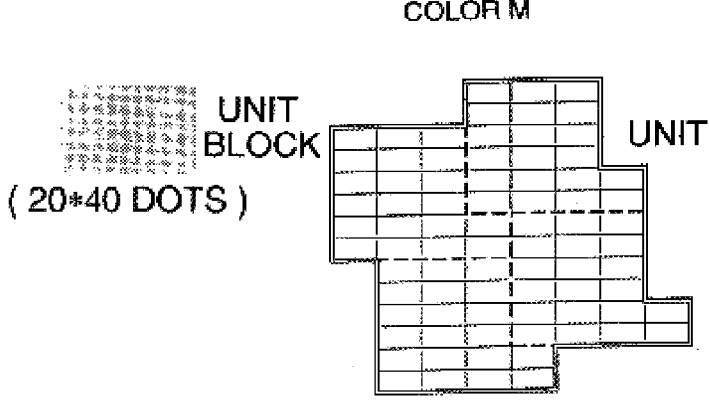
FIG. 14 is a diagram showing a unit block and units for color M (a screen angle of approximately 15 degrees.
Figure 15:
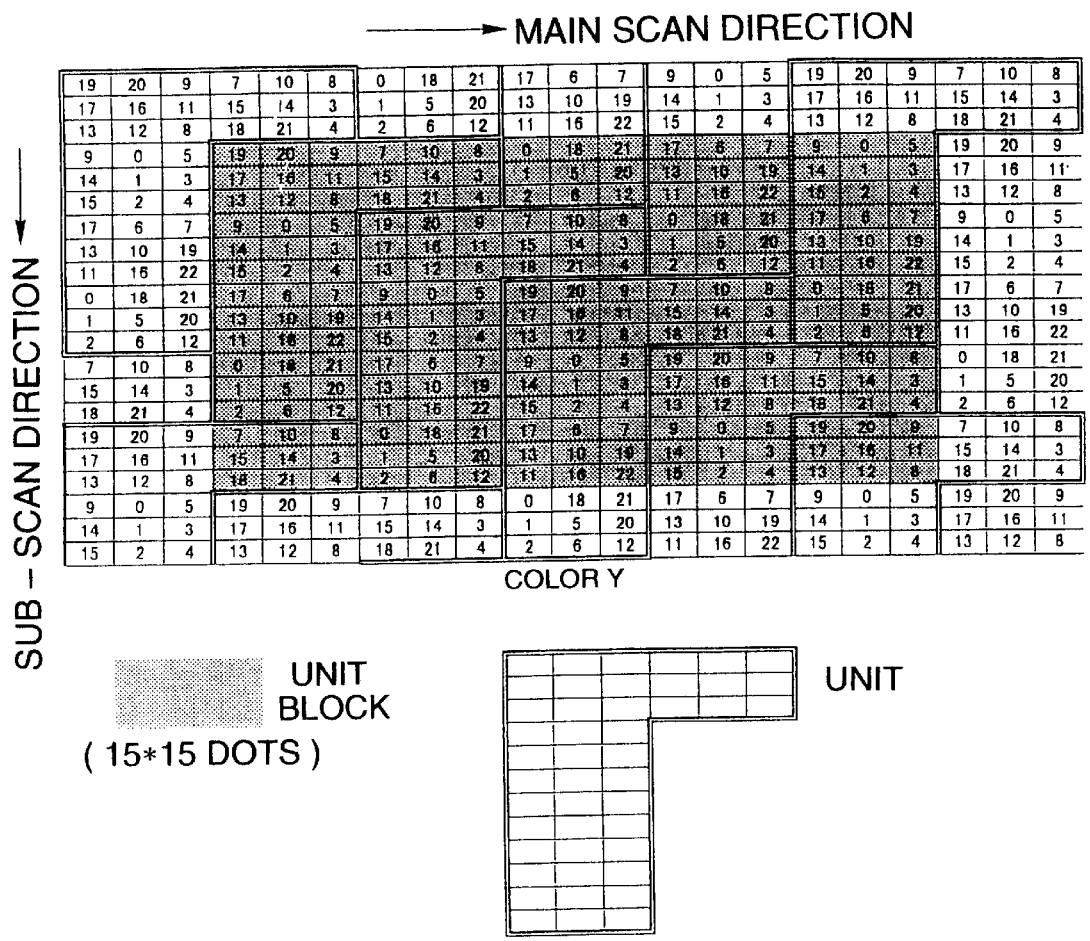
FIG. 15 is a diagram showing a unit block and units for color Y (a screen angle of approximately 30 degrees.

Similarly, transformation matrixes in which are entered the numbers for characteristic curves for colors C, M and Y are shown in FIGS. 13 to 15. The gray level transformation is performed for the other colors, C, M and Y in the same manner as for color K, and energy values obtained by transforming the print data are output to the printing unit 40.

Figure 16:
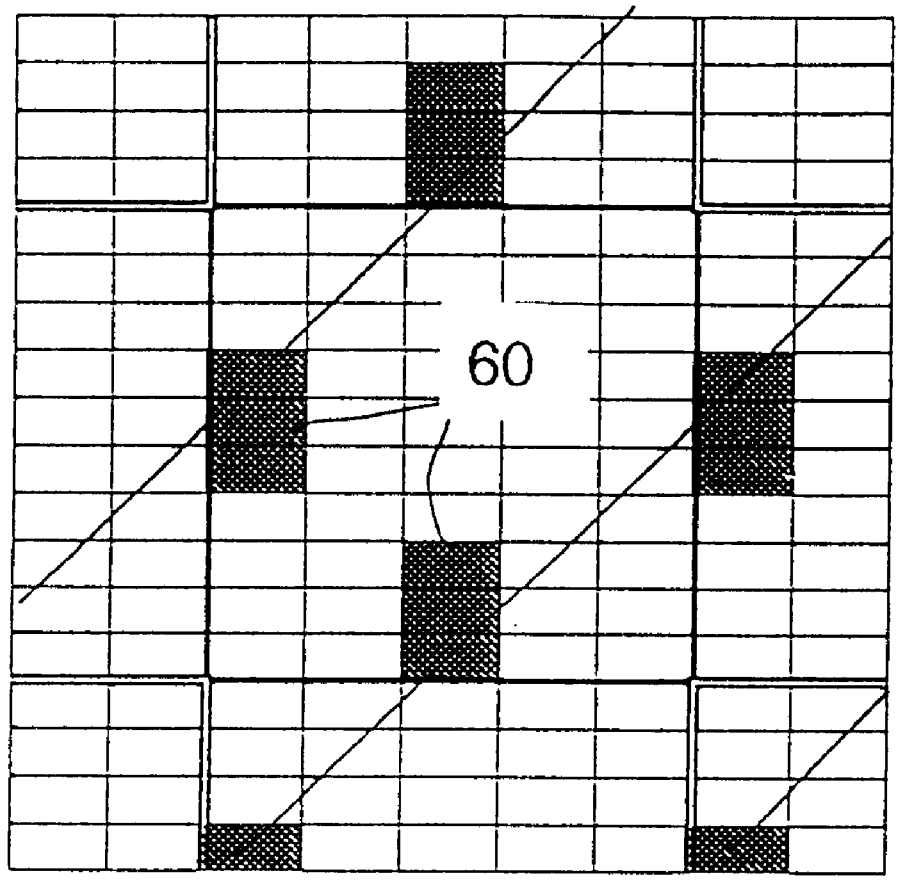
FIG. 16 is a conceptual diagram for explaining a print dot pattern for color K (a screen angle of approximately 45 degrees)

The transformation matrixes for the individual colors will now be described in detail while referring to FIGS. 12 to 15. First, in the K color matrix in FIG. 12, a unit block expressed with a light colored background has the same 5×10 dot size as does a unit that will be described later. This unit block is recorded as a square matrix when the print resolution in the sub-scan direction is doubled to equal the resolution in the main scan direction. To simplify the description, assume that the gray level image is constant when equal to or greater than 0, and characteristic curves 0, 1 and 2 in FIG. 12 primarily are used for printing. Then, a pattern of print dots 60, which are recorded at a predetermined density at light color display positions in FIG. 16, is obtained. The screen angle (the angle at which the print dots are arranged) of the print pattern is approximately 45 degrees, as is indicated by the diagonal lines.

As to the order in which dots are grown in a unit block, as is shown in FIG. 16, first, two print dots 60 are formed at the same time in a unit block. As the dots 60 continue to grow, they are enlarged substantially from the centers of four sides of the unit block. That is, when the print dots have grown until they are at about the level of the half tone, a total of four ½ size print dots are present in the unit block.

For color C, as is shown in FIG. 13, a unit block expressed with a light color background is composed of 20 dots in the main scan direction and 40 dots in the sub-scan direction, and a plurality of units having shapes other than squares are present in the unit block. Each of the units is formed of four sub-units.

In other words, the size of a unit grid is equivalent to the least common multiple of the size of the unit for which the two dimensional periodicity is obtained in the perpendicular direction, when the units are fully attached to the plane with no intervening gap. That is, the unit grids are repetitiously arranged, so that the units and the sub-units are automatically and neatly arranged.

The unit block can be set to a 10×10 dot size by defining a sub-unit as one unit. However, in this embodiment, since the occurrence of tone jump is prevented by sightly changing the internal structure of each sub-unit (the assignment of a characteristic curve), four sub-units form one unit. Of course, as required, an arbitrary number of sub-units can be used to constitute one unit.

Figure 17:
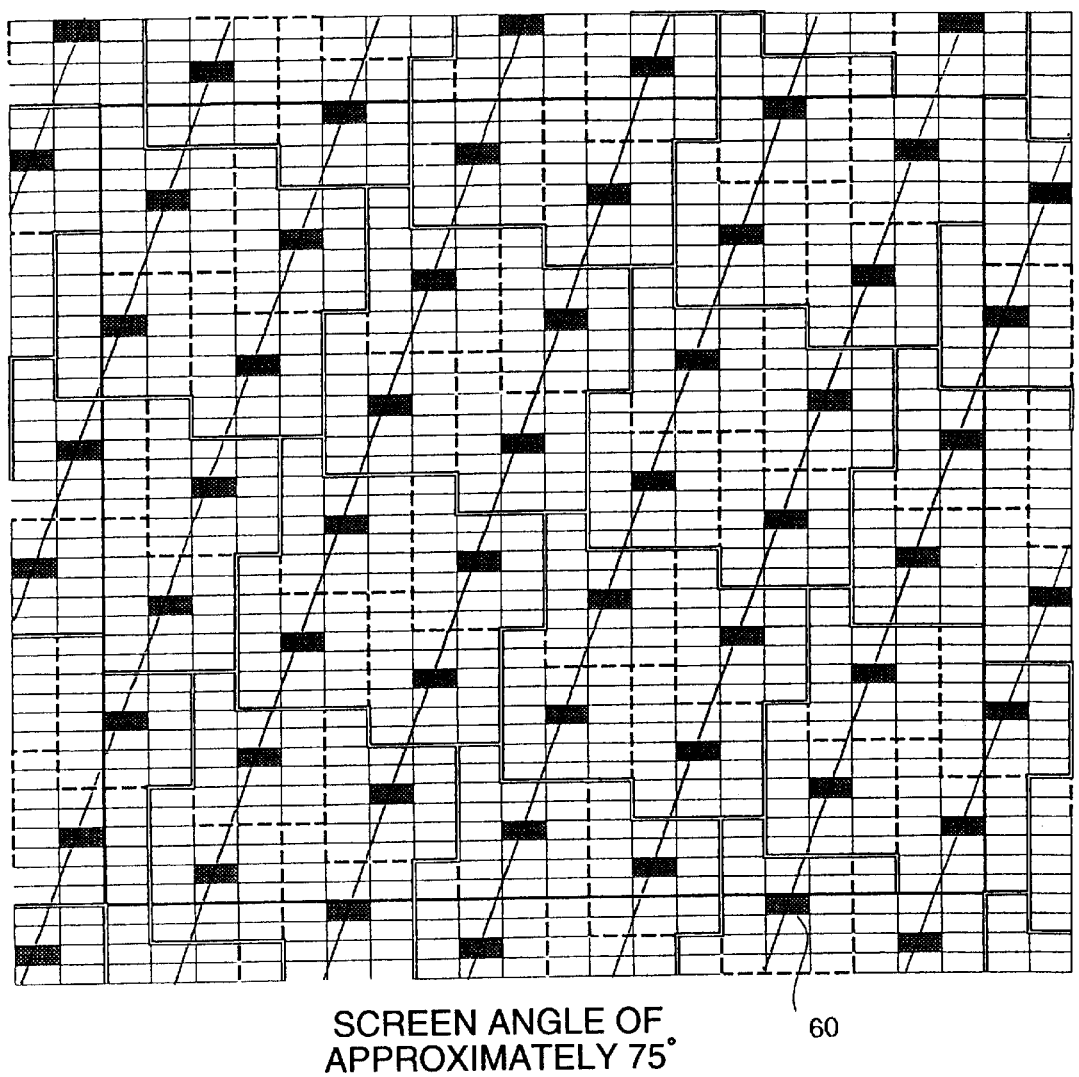
FIG. 17 is a conceptual diagram for explaining a print dot pattern for color C (a screen angle of approximately 75 degrees)

As in the above description, assume that characteristic curves 0, 20, 40 and 60 are primarily used for printing. A pattern of print dots 60 that are recorded at a predetermined density at a light color display position in FIG. 17 is obtained. The screen angle of the print pattern is approximately 75 degrees, as is indicted by the diagonal lines.

For the transformation matrix for color M in FIG. 14, as it is for color C, the minimum block in which units, each of which is composed of four sub-units, are arranged at a specific periodicity is employed as a unit block. The size of this unit block is 20 dots in the main scan direction and 40 dots in the sub-scan direction.

Figure 18:
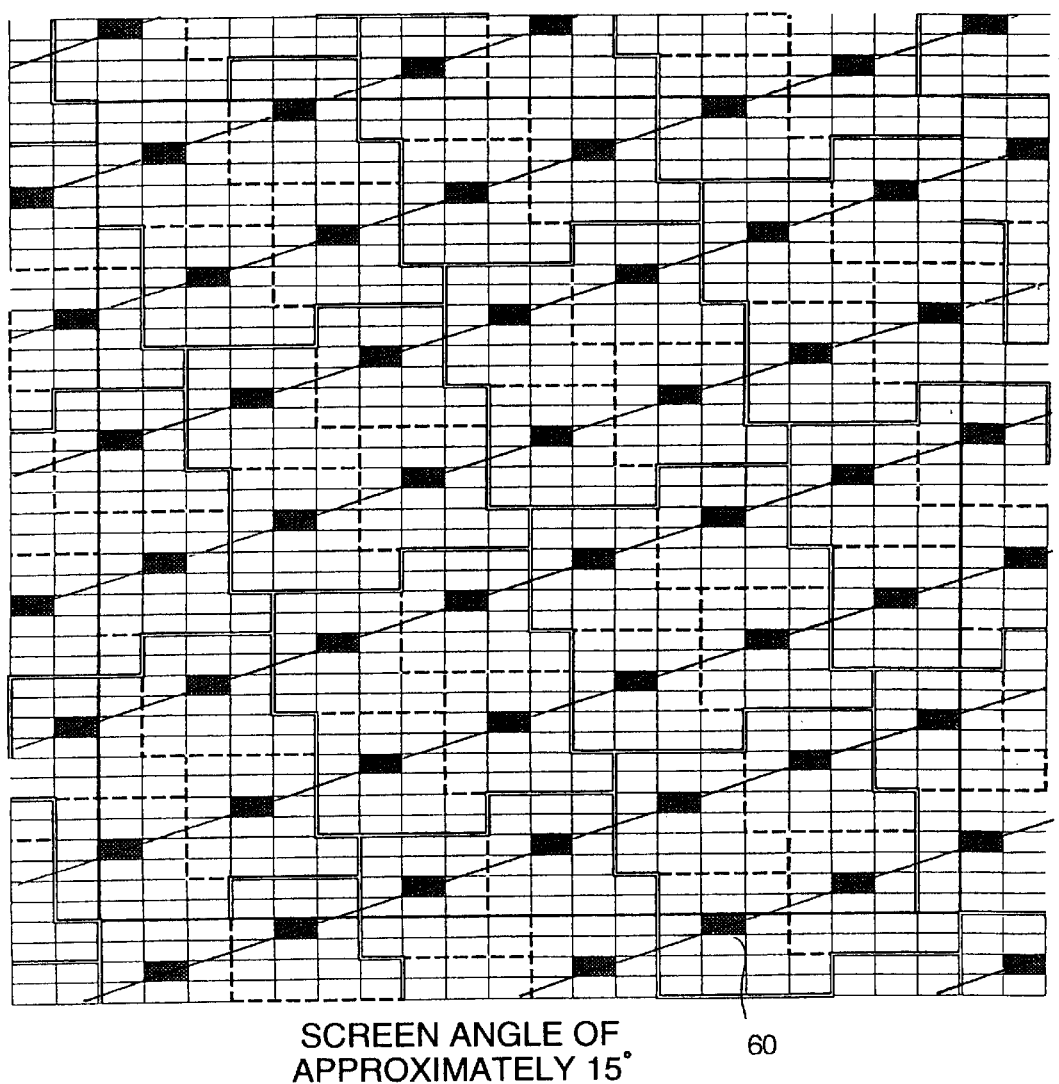
FIG. 18 is a conceptual diagram for explaining a print dot pattern for color M (a screen angle of approximately 15 degrees)

Assuming that characteristic curves 0, 20, 40 and 60 in FIG. 9 are primarily used for printing, the pattern shown in FIG. 18 is obtained. The screen angle of the print pattern is approximately 15 degrees.

For color Y in FIG. 15, a unit block is a rectangle of 15 dots in the main scan direction and 15 blocks in the sub-scan direction. This unit block is also composed of a plurality of units, and is the minimum unit, as it is for the other colors, in which the units are arranged according to a specific periodicity.

Figure 19:
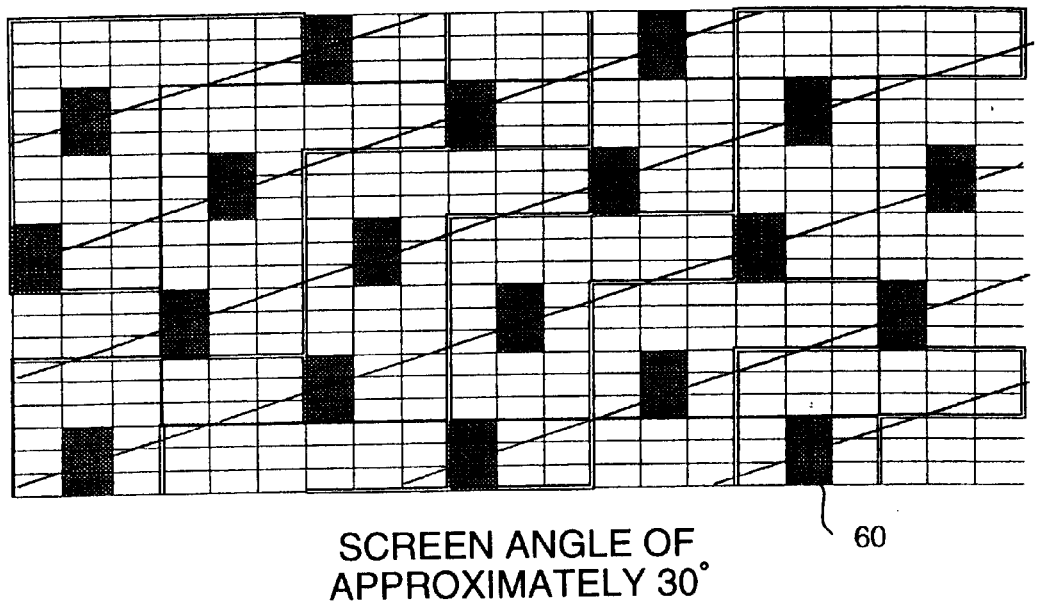
FIG. 19 is a conceptual diagram for explaining a print dot pattern for color Y (a screen angle of approximately 30 degrees).

Assuming that the characteristic curves 0, 1 and 2 in FIG. 10 primarily are used for printing, the pattern in FIG. 19 is obtained. The screen angle of this pattern is approximately 30 degrees.

As the order for growing dots in this unit block, as is shown in FIG. 19, first, two print dots 60 are formed at the same time in a unit block, and as the dots 60 continue to grow, they are enlarged substantially at three places in the unit block.

As is described above, the image forming apparatus of this invention employs the transformation characteristics in FIGS. 7 to 10 to define energy applied to print positions corresponding to the transformation matrixes in FIGS. 12 to 15, and forms an image for input gray level image data for individual colors.

The transformation into energy is performed based on the transformation characteristics in FIGS. 7 to 10. When the relationship between the energy applied to the highlighted portion, relative to the transformation characteristic, and the energy applied to the shadow portion is set as follows, a high quality image can be formed. The condition for setting the transformation characteristic for energy will now be described.

Generally, according to the transformation curve for the highlighted portion, as the energy applied is increased, improved printing stability is obtained. However, if the energy applied is high for all the gray levels, the energy applied to the shadow portion will be excessive, so that deterioration of the image will occur; for example, a recording medium may be damaged or a blank area may occur. And as for recording material that is thermally melted for a transfer process, a feathered or bleeding image or stripes may be formed by melting ink, or the inks may run together or form an undesirable pattern. Therefore, a uniform increase in the energy that is applied is not preferable.

The transformation curve for the shadow portion is specified by a recording head voltage condition and a pulse cycle condition, and is mainly set in accordance with the material used for a recording. Therefore, it is not preferable for the characteristic curve to be intentionally adjusted using the image forming apparatus.

In this embodiment, the transformation curve is set as follows.

Using the transformation curve in FIG. 7 as an example, a maximum energy value A, in an area wherein the printing density is equal to or lower than a half tone, is 255, provided along transformation curves 0 and 2. The minimum envelope value B, which is obtained by linking the extrema of the individual transformation characteristics for areas wherein the printing density is equal to or higher than a half tone, is approximately 169, provided along transformation curves 17 to 24.

The maximum value A is larger than the minimum energy value B, and the ratio of the minimum energy value B to the maximum value A is 66.3%.

When the maximum energy value A is increased, the repetitive reproductivity performed during printing is increased for the highlighted portion, and excessive energy is not applied to the shadow portion, so that the printing condition in the low gray level area is satisfactory. Thus, a high quality printed image can be provided.

Shown in Table 1 are the results obtained for the quality of images printed by the image forming apparatus of the present invention, under the conditions established for the embodiments, and for the comparison examples.

TABLE 1

| | A | B | B/A | Repetitious reproductivity of highlighted portion | Condition of shadow portion |
|---|---|---|---|---|---|
| Embodiment 1 | 255 | 169 | 66.3% | ◉ | Good |
| Embodiment 2 | 226 | 169 | 74.8% | ○ | Good |
| Embodiment 3 | 200 | 169 | 84.5% | x | Good |
| Embodiment 4 | 255 | 192 | 75.3% | ○ | Blanks occurred due to excessive energy |
| Comparison | 200 | 200 | 100% | X | X |

The conditions established for the experiments were as follows.
a. recording head
   element pitch: 600 dpi
   element size: 35 μm in main scan direction,
      40 μm in sub-scan direction
   number of elements: 7296
   resistance: 4000 Ω on average
b. recording material
   ribbon:
      digital color proof by Fuji Photo Film Co., Ltd.
      FirstProof ribbon J
   receiver:
      digital color proof by Fuji Photo Film Co., Ltd.
      FirstProof receiver sheet
c. recording condition
   recording resolution: 600 dpi in main scan direction
      1200 dpi in sub-scan direction The heatsensitive transfer/recording material included a substantially transparent heatsensitive ink layer, which contained a pigment of 30 to 70 weight % and an amorphous organic polymer of 25 to 60 weight %, which had a softening point of 40° C. to 150° C. and a thickness of 0.2 to 1.0 μm, so that a particle diameter of at least 70% of the pigment in the heatsensitive ink layer was equal to or smaller than 1.0 μm, and so that on a white supporting member the optical reflective density of a transferred image was at least 1.0 μm.

When the gray level image data for the KCMY colors were printed under the above conditions, the following results were obtained for the embodiments and the comparison examples.

In Embodiment 1 in Table 1, the conditions described for the above embodiment were employed, and the ratio B/A was 66.3%. For the printed image for Embodiment 1, repetitive reproduction was extremely high for the highlighted portion, and the state of the shadow portion was satisfactory.

In Embodiment 2, the value B in Embodiment 1 was employed unchanged, and the value A was reduced to 226. In Embodiment 2, the ratio B/A was 74.8%, the repetitive reproductivity was high for the highlighted portion, and the state of the shadow portion was satisfactory.

In Embodiment 3, the value B in Embodiment 1 was employed unchanged, and the value A was further reduced to be the ratio B/A was 84.5%. In Embodiment 3, the repetitive reproductivity was low for the highlighted portion, and the state of the shadow portion was good. Therefore in the case that image quality in the highlighted portion is not required to be so good, even in this condition sufficient image quality can be obtained.

In embodiment 4, the ratio B/A was set to 75.3% by reducing the value B while maintaining value A at 255. In Embodiment 4, although the repetitive reproductivity was satisfactory for the highlighted portion, a blank area occurred in the shadow portion. Therefore in the case that image quality in the shadow portion is not required to be so good, even in this condition sufficient image quality can be obtained.

Contrary that, in comparison example, the ratio B/A was set to 100% while maintaining value A and B at 200. In the comparison example, the repetitive reproductivity was low for the highlighted portion, and a blank area occurred in the shadow portion As is described above, when value A was set to be larger than value B(B<A), preferably the ratio B/A was set smaller than 85%, satisfactory results could be obtained for at least one of the highlighted portion and the shadow portion, and a high quality image could be printed. Further when the ratio B/A was set smaller than 75%, satisfactory results could be obtained for the highlighted portion and the shadow portion, and a high quality image could be printed. As the ratio B/A was reduced, the image quality increased.

The image forming apparatus and the image forming method of this invention can be satisfactorily applied for a thermal printer using the Louver method or the VDS method, a VR screen printer, a laser beam printer or an ink-jet printer, and the same effects can be obtained.

Generally, When the energy applied is increased, for example,in thin film thermal transfer typed image forming apparatus, image density is lowered. In ink-jet typed image forming apparatus, image confusion or late drying is sometimes accompanied with increase of excess of ink. Further in silver salt typed image forming apparatus, image density is reversed.

According to using a image forming method of the present invention, in image forming apparatus as above described, satisfactory results could be obtained as a whole. In the highlighted portion stable image can be obtained and in the shadow portion a high quality image could be printed.

According to the image forming apparatus of this invention, the gray level transformation characteristic is so set that B<A, preferablly B<0.85A is established, wherein A denotes a maximum value for multi-valued data when the printing density of the gray level image data is equal to or lower than a half tone, and B denotes a minimum value for an envelope that is obtained by coupling extrema of multi-valued data, relative to transformation characteristic curves for the printing density, that are equal to or higher than a half tone. Therefore, the relative energy applied to the highlighted portion can be increased to improve the stability of the density, and the relative energy applied to the shadow portion can be reduced to remove a barrier due to the excessive application of energy. As a result, a high quality printed image can be obtained.

Since a thermal head is employed as the recording head of the image forming apparatus, multi-valued data obtained by a gray level transform can be output as energy that is to be applied to the thermal head, and the data can be used for high quality printing. Further, an image having an extremely high quality can be formed on a heatsensitive transfer material.

What is claimed is:

1. An image forming method, comprising the steps of:
dividing an input gray level image data into a plurality of blocks; and
converting said gray level image data into multi-valued data for gray level recording, in accordance with a gray level transformation characteristic, determined in accordance with relative pixel positions in each of said blocks, whereby said gray level transformation characteristic is so set that B<A is established, wherein A denotes a maximum value for multi-valued data when the printing density of said gray level image data is equal to or lower than a half tone, and B denotes a minimum value for an envelope that is obtained by individually coupling extrema of multi-valued data, relative to transform property curves for said printing density, that are equal to or higher than said half tone.

2. An image forming method according to claim 1, wherein said gray level transformation characteristic is so set that B<0.85A is established.

3. An image forming apparatus, which comprises a means of dividing an input gray level image data into a plurality of blocks; and a means of converting said gray level image data into multi-valued data for gray level recording, in accordance with a gray level transformation characteristic, determined in accordance with relative pixel positions in each of said blocks, whereby said gray level transformation characteristic is so set that B<A is established, wherein A denotes a maximum value for multi-valued data when the printing density of said gray level image data is equal to or lower than a half tone, and B denotes a minimum value for an envelope that is obtained by individually coupling extrema of multi-valued data, relative to transform property curves for said printing density, that are equal to or higher than said half tone.

4. An image forming apparatus according to claim 3, wherein said gray level transformation characteristic is so set that B<0.85A is established.

5. An image forming apparatus according to claim 3, wherein a thermal head is employed as a recording head for said image forming apparatus.

6. An image forming apparatus according to claim 3, wherein a heatsensitive transfer material is employed that includes a substantially transparent heatsensitive ink layer, which contains a pigment of 30 to 70 weight % and an amorphous organic polymer of 25 to 60 weight %, which has a softening point of 40° C. to 150° C. and has a thickness of 0.2 to 1.0 $\mu$m, so that the particle diameter of at least 70% of said pigment in said heatsensitive ink layer is equal to or smaller than 1.0 $\mu$m, and so that on a white supporting member the optical reflective
density of a transferred image is at least 1.0 $\mu$m.

* * * * *